United States Patent
Varshney et al.

(10) Patent No.: US 9,998,462 B2
(45) Date of Patent: Jun. 12, 2018

(54) ASYNCHRONOUS DESIGN DATA EXCHANGE WITH EXTERNAL USERS

(71) Applicant: Siemens Product Lifecycle Management Software Inc., Plano, TX (US)

(72) Inventors: Vaibhav Varshney, Pune (IN); Chandar Panjwani, Pune (IN); Vasant Kulkarni, Pune (IN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 574 days.

(21) Appl. No.: 14/485,305

(22) Filed: Sep. 12, 2014

(65) Prior Publication Data

US 2015/0356505 A1 Dec. 10, 2015

(30) Foreign Application Priority Data

Jun. 5, 2014 (IN) .............................. 614/KOL/2014
Jun. 5, 2014 (IN) .............................. 616/KOL/2014

(51) Int. Cl.
*G06Q 10/10* (2012.01)
*H04L 29/06* (2006.01)

(52) U.S. Cl.
CPC .......... *H04L 63/10* (2013.01); *G06Q 10/101* (2013.01); *H04L 63/0853* (2013.01)

(58) Field of Classification Search
CPC ... H04L 63/10; H04L 63/0853; G06Q 10/101; G06Q 10/04; G06Q 10/06; G06Q 10/06312; G06Q 50/04; Y02P 90/30

USPC ......................................................... 709/203
See application file for complete search history.

(56) References Cited

U.S. PATENT DOCUMENTS

| | | | |
|---|---|---|---|
| 2004/0024764 A1* | 2/2004 | Hsu ........................ | G06F 21/31 |
| 2004/0098292 A1* | 5/2004 | Miller ..................... | G06Q 99/00 |
| | | | 709/224 |
| 2004/0181417 A1* | 9/2004 | Piller .................. | G06Q 10/087 |
| | | | 705/300 |

(Continued)

FOREIGN PATENT DOCUMENTS

WO 2003107224 A1 12/2003

OTHER PUBLICATIONS

Communication From European Application No. 15169858.6, European Search Report dated Jul. 27, 2015, 8 pages.

(Continued)

*Primary Examiner* — Wing F Chan
*Assistant Examiner* — Billy H Ng

(57) ABSTRACT

A method for an asynchronous data exchange between a PLM system and an external user. The method includes defining an exchange definition object related to product data, packing the exchange definition object for transfer, publishing the packed exchange definition object through an SRM to a browser of the external user, receiving a product data download request from the browser of the external user through the SRM, transferring the product data from a file management system of the PLM system to the file transfer manager of the external user, receiving a response exchange definition object from the browser of the external user through the SRM, and receiving the response product data from the file transfer manager of the external user.

20 Claims, 3 Drawing Sheets

(56) References Cited

U.S. PATENT DOCUMENTS

| | | | |
|---|---|---|---|
| 2007/0013709 A1* | 1/2007 | Charles | G06F 17/50 |
| | | | 345/581 |
| 2007/0061154 A1* | 3/2007 | Markvoort | G06F 17/50 |
| | | | 705/51 |
| 2009/0024647 A1* | 1/2009 | Hein | G06Q 10/04 |
| 2009/0216804 A1* | 8/2009 | Kersavage | G06Q 10/04 |
| 2010/0114355 A1* | 5/2010 | Harashima | G06Q 10/06 |
| | | | 700/107 |
| 2011/0153679 A1 | 6/2011 | Franz | |
| 2011/0264591 A1* | 10/2011 | Song | G06Q 10/06 |
| | | | 705/300 |
| 2012/0095973 A1* | 4/2012 | Kehoe | G06F 8/70 |
| | | | 707/694 |

OTHER PUBLICATIONS

European Search Report dated Sep. 24, 2015, for EP Application No. 15169844.6, 6 pages.

\* cited by examiner

ASYNCHRONOUS DESIGN DATA EXCHANGE WITH EXTERNAL USERS

RELATED APPLICATIONS

This patent document claims priority under 35 U.S.C. § 119 and all other benefits from Indian Provisional Patent Application Serial No. 614/KOL/2014, filed Jun. 5, 2014, titled: "Asynchronous Design Data Exchange With External Users", and Indian Provisional Patent Application Serial No. 616/KOL/2014, filed Jun. 5, 2014, titled: "Secured Data Exchange with External Users", the contents of which are hereby incorporated by reference to the extent permitted by law.

TECHNICAL FIELD

The present disclosure is directed, in general, to computer-aided design ("CAD"), visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include a method for an asynchronous data exchange between a PLM system and an external user. The method includes defining an exchange definition object related to product data, packing the exchange definition object for transfer, publishing the packed exchange definition object through an SRM to a browser of the external user, receiving a product data download request from the browser of the external user through the SRM, transferring the product data from a file management system of the PLM system to the file transfer manager of the external user, receiving a response exchange definition object from the browser of the external user through the SRM, and receiving the response product data from the file transfer manager of the external user.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
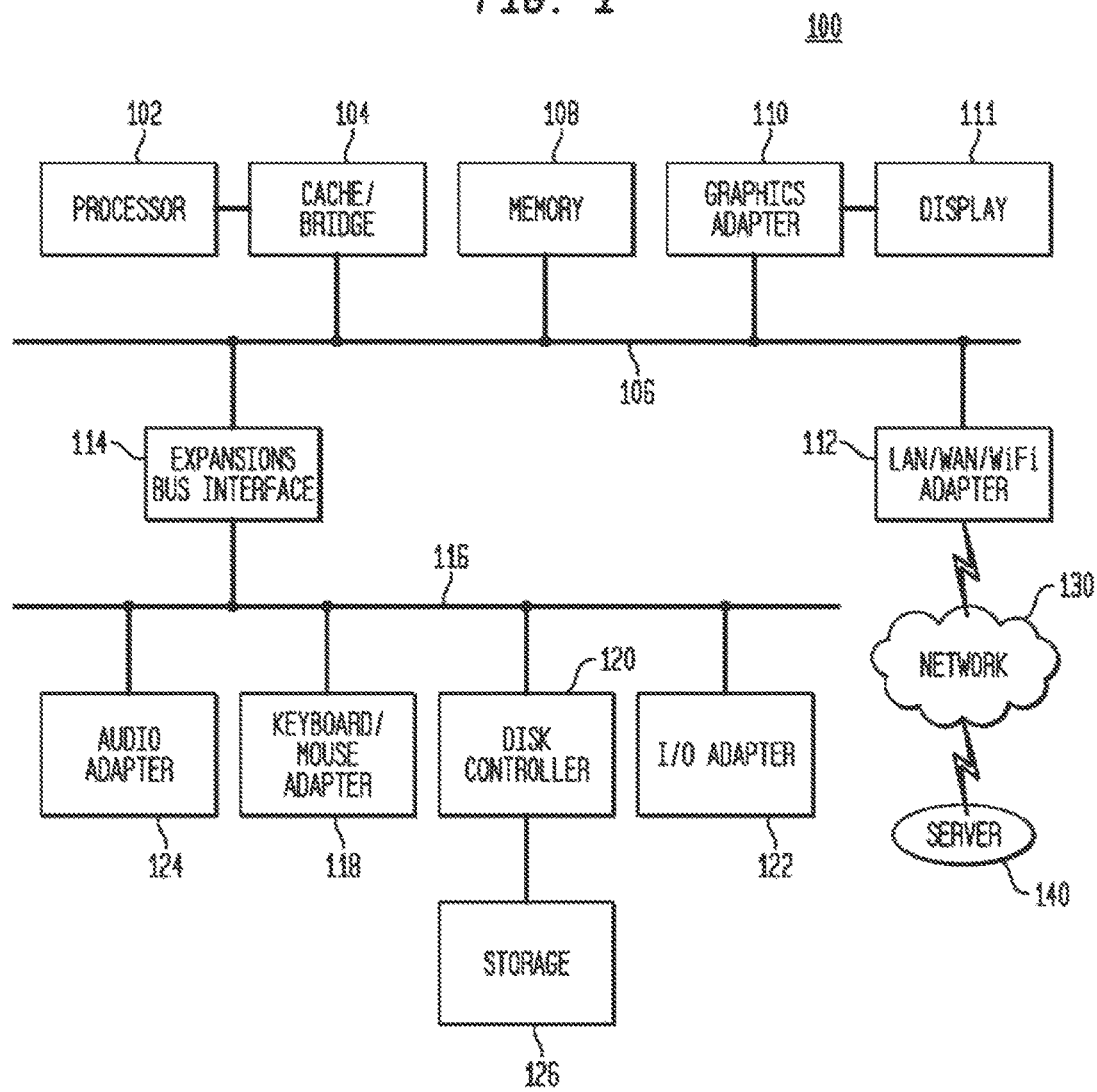
FIG. 1 depicts a block diagram of a data processing system in which an embodiment can be implemented.
Figure 2:
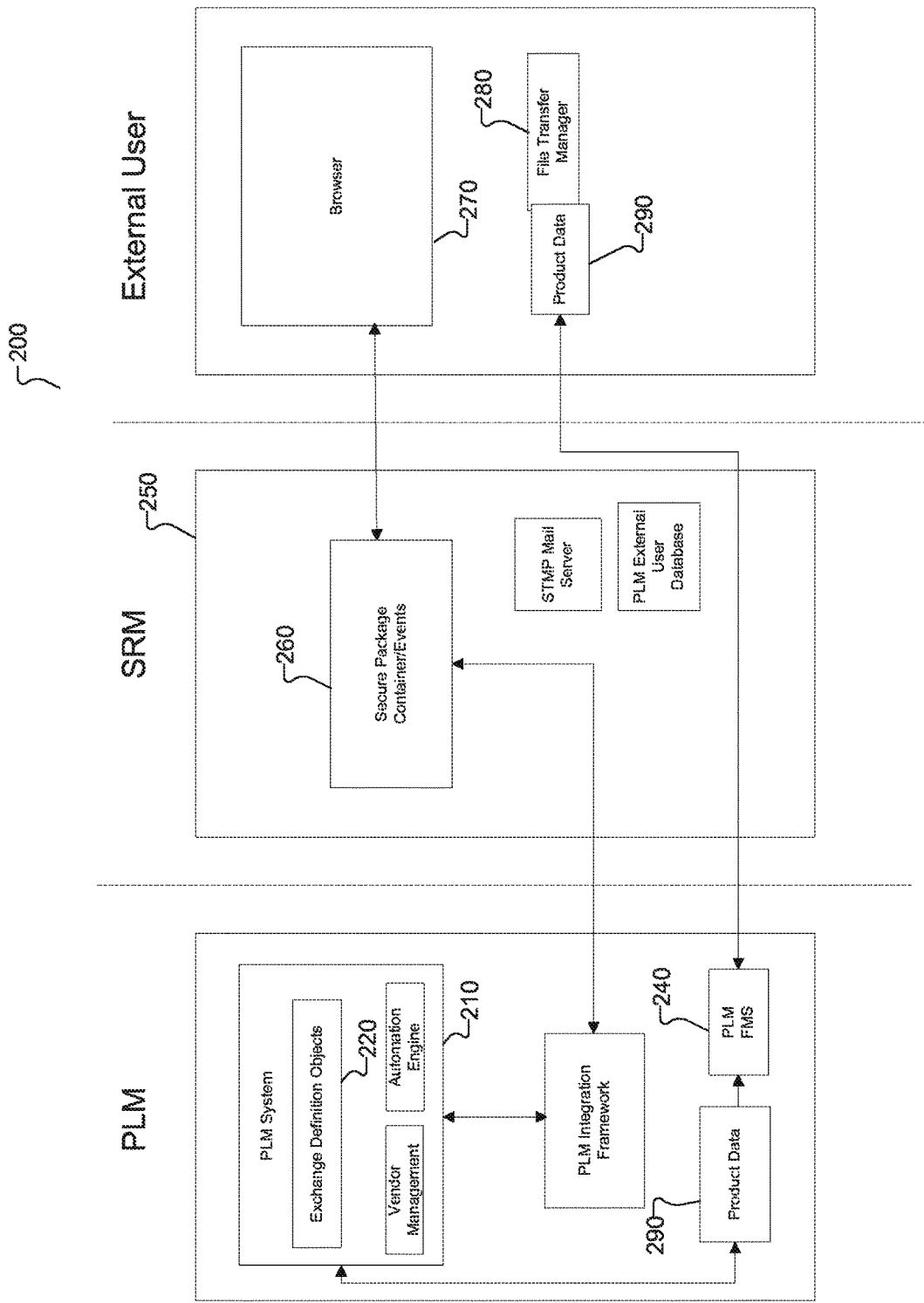
FIG. 2 illustrates a system which connects a PLM system to external users in accordance with the present disclosure.
Figure 3:
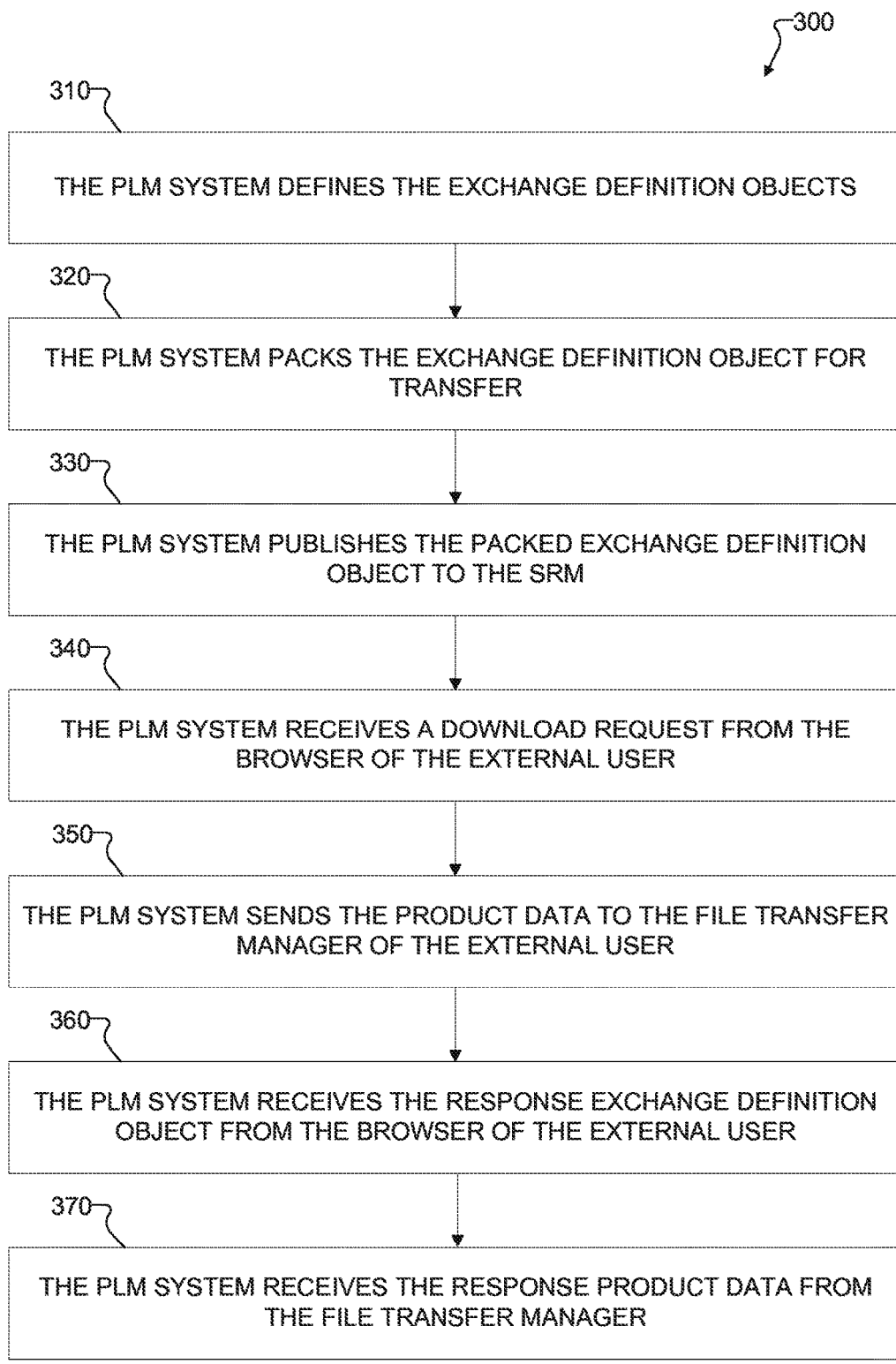
FIG. 3 illustrates an asynchronous data exchange method between a PLM system and an external user in accordance with the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

For competitive business environments, external users involvement is needed early in the design cycle process. Automation of exchanging product data with disconnected external users who do not have access to the PLM system has become a priority. Exchanging design data to multiple independent external users using an exchange definition object provides automation of sending requests and receiving response from the external users. The exchange information is also stored to recreate the exchange of data and provide traceability.

FIG. 1 depicts a block diagram of a data processing system in which an embodiment can be implemented, for example, as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIG. 2 illustrates a system which connects a PLM system 200 to external users in accordance with the present disclosure. The PLM system uses exchange definition objects 220, an automated engine and a flexible integration process to publish and retrieve product data 290 to and from multiple external users.

The exchange definition object 220 holds all the information of the various types of PLM product data 290 that is being exported to external users. The exchange definition object 220 has the ability to collect and manage references to the different items and assemblies from the PLM system. The exchange object 220 also builds and stores the recipe to recreate the data that was sent. The exchange object 220 further manages the assignment and access of product data 290 to the external users.

The exchange definition object 220 evaluates the access rights of assigned external users to the data with the complex security rule mechanism in place in the PLM system. The exchange definition object 220 also starts the automation engine for generating product data 290 for each external user, makes this data available through a data management system and invokes external system processes to receive the data and to provide data access to external users. Storing the data and evaluating access and export of product data to external users provides traceability of the exchange by providing queries and ability to add queries to generate reports on the exchanges.

The exchange definition object 220 also has the ability to hold data received in response from the external user. The PLM runs an automation workflow processes to review the response data, the PLM system approves or rejects the data received. Upon approval of the data, the received product data will be integrated into the PLM system.

Other information stored in the exchange definition object 220 includes: the exchange product data 290 in transition to external users, the product data 290 being successful sent to external users, the product data 290 actively being accessed by the external users, information about the status of responses from the external users, the status of acceptance of the response by the PLM system 210, and the status of integration of the accepted response data into the PLM system 210. The exchange definition object 220 notifies the PLM system and the external user of the state and availability of all the previously mentioned data.

The Supplier Relationship Management (SRM) 250 controls the interaction between the external user and the protected PLM system 210. The external user accesses the SRM 250 from a remote location on any type of platform. In one embodiment, the external user can use a web browser 270 to access the SRM 250. The SRM controls secure package container and events 260.

The file management system (FMS) 240 is one of the PLM components for managing files. The FMS is responsible for all transaction related to files from the PLM system and client.

FIG. 3 illustrates an asynchronous data exchange method 300 between a PLM system and an external user in accordance with the present disclosure.

The method of exchanging the data is transparent and seamless for the external user. The method allows for an external user to request, or pull, product data 290 from the PLM system or the PLM side selects particular data and sends, or pushes, product data 290 to external users. Both the pulling of data and pushing of data is performed in a secure manner defined by security rules in the PLM system that would be executed to control access of product data 290 to external users.

In step 310, the PLM system 210 defines the exchange definition objects 220 related to the product data 290. The exchange definition objects 220 stores information concerning the product data 290 including references to different items and assemblies from the PLM system, information to reproduce the product data 290 stored, and the assignment or ability of the external user to access product data 290.

In step 320, the PLM system 210 then packs the exchange definition object 220 for transfer. The exchange definition object 220 can be packed in any file type suitable for the external user's access, including zip files.

In step 330, the PLM system publishes the packed exchange definition object 220 through the SRM 250 to the browser of the external user. The Secure Package Container 260 transfers the packed exchange definition object 220 to the STMP mail server, the PLM external user collaboration database and to the browser 270 of the external user.

In step 340, the PLM system 210 receives a download request from the browser 270 of the external user through the SRM 250.

In step 350, the PLM FMS 240 transfers the product data to the file transfer manager 280 of the external user. In another embodiment, the file transfer manager 280 also has the ability to pull product data 290 from the PLM FMS without notification from the PLM system.

In step 360, the PLM system 210 receives the response exchange definition object from the browser 270 of the external user through the SRM. The response indicates that the product data 290 sent to the external user has been updated.

In step 370, the PLM system receives the product data 290 from the file transfer manager 280 of the external user. The PLM system 210 uses the automation engine 210 to review the response product data 290. As part of the review, the PLM system checks for different potential errors which would be created integration of the updated product data 290. Upon the PLM system determining that no errors would occur with the update product data 290, the PLM system integrates the response product data 290 back into the PLM system.

In certain embodiments, the exchange definition object 220 contains information on the status of the product data 290 including product data in transition status, product data received status, product data access status, and product data integration status. The exchange definition object 220 has the function to notify the PLM system or the external user on the status of the product data 290.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for an asynchronous data exchange between a product lifecycle management (PLM) system and an external user comprising:
    defining an exchange definition object referencing product data related to different items and assemblies included in the PLM system;
    packing the exchange definition object for transfer;
    publishing the packed exchange definition object through a supplier relationship management (SRM) system to a browser of the external user;
    receiving a product data download request from the browser of the external user through the SRM system;
    transferring, from a file management system of the PLM system to a file transfer manager of the external user, the product data corresponding to the received product data download request;
    receiving a response exchange definition object from the browser of the external user through the SRM system;
    receiving response product data from the file transfer manager of the external user;
    determining, by the PLM system, whether errors would occur before integration of the received response product data; and
    integrating the response product data into the PLM system if determined that no errors would occur.

2. The method for an asynchronous data exchange between a PLM system and an external user of claim 1, wherein the PLM system approves or rejects the received response product data.

3. The method for an asynchronous data exchange between a PLM system and an external user of claim 1, wherein the exchange definition object comprises assignment and access information of the product data to the external user.

4. The method for an asynchronous data exchange between a PLM system and an external user of claim 1, wherein the exchange definition object comprises information relevant to a current state of exchange of the product data.

5. The method for an asynchronous data exchange between a PLM system and an external user of claim 4, wherein the information relevant to a current state of exchange of the product data includes product data in transition status, product data received status, product data access status, and product data integration status.

6. The method for an asynchronous data exchange between a PLM system and an external user of claim 1, further comprising:
    notifying the PLM system of a status and availability of product data.

7. The method for an asynchronous data exchange between a PLM system and an external user of claim 1, further comprising:
   notifying the external user of a status and availability of product data.

8. A product lifecycle management (PLM) system comprising:
   a processor; and
   an accessible memory, the PLM system particularly configured to:
      define an exchange definition object referencing product data related to different items and assemblies included in the PLM system;
      pack the exchange definition object for transfer;
      publish the packed exchange definition object through a supplier relationship management (SRM) system to a browser of an external user;
      receive a product data download request from the browser of the external user through the SRM system;
      transfer, from a file management system of the PLM system to a file transfer manager of the external user, the product data corresponding to the received product data download request;
      receive a response exchange definition object from the browser of the external user through the SRM system;
      receive response product data from the file transfer manager of the external user;
      determining whether errors would occur before integration of the received response product data; and
      integrating the response product data into the PLM system if determined that no errors would occur.

9. The PLM system of claim 8, wherein the PLM system approves or rejects the received response product data.

10. The PLM system of claim 8, wherein the exchange definition object comprises assignment and access information of the product data to the external user.

11. The PLM system of claim 8, wherein the exchange definition object comprises information relevant to a current state of exchange of the product data.

12. The PLM system of claim 11, wherein the information relevant to a current state of exchange of the product data includes product data in transition status, product data received status, product data access status, and product data integration status.

13. The PLM system of claim 8, further comprising:
   notify the PLM system of a status and availability of product data.

14. The PLM system of claim 8, further comprising:
   notify the external user of a status and availability of product data.

15. A non-transitory computer-readable medium encoded with executable instructions that, when executed, cause a product lifecycle management (PLM) system to:
   define an exchange definition object referencing product data related to different items and assemblies included in the PLM system;
   pack the exchange definition object for transfer;
   publish the packed exchange definition object through a supplier relationship management (SRM) system to a browser of an external user;
   receive a product data download request from the browser of the external user through the SRM system;
   transfer, from a file management system of the PLM system to a file transfer manager of the external user, the product data corresponding to the received product data download request;
   receive a response exchange definition object from the browser of the external user through the SRM system;
   receive response product data from the file transfer manager of the external user;
   determining whether errors would occur before integration of the received response product data; and
   integrating the response product data into the PLM system if determined that no errors would occur.

16. The non-transitory computer-readable medium of claim 15, wherein the PLM system approves or rejects the received response product data.

17. The non-transitory computer-readable medium of claim 15, wherein the exchange definition object comprises assignment and access information of the product data to the external user.

18. The non-transitory computer-readable medium of claim 15, wherein the exchange definition object comprises information relevant to a current state of exchange of the product data.

19. The non-transitory computer-readable medium of claim 15, further comprising:
   notify the PLM system of a status and availability of product data.

20. The non-transitory computer-readable medium of claim 15, further comprising:
   notify the external user of a status and availability of product data.

* * * * *